Nov. 15, 1938.  R. D. BUCKWALTER  2,136,732
BALING WIRE
Filed March 12, 1937
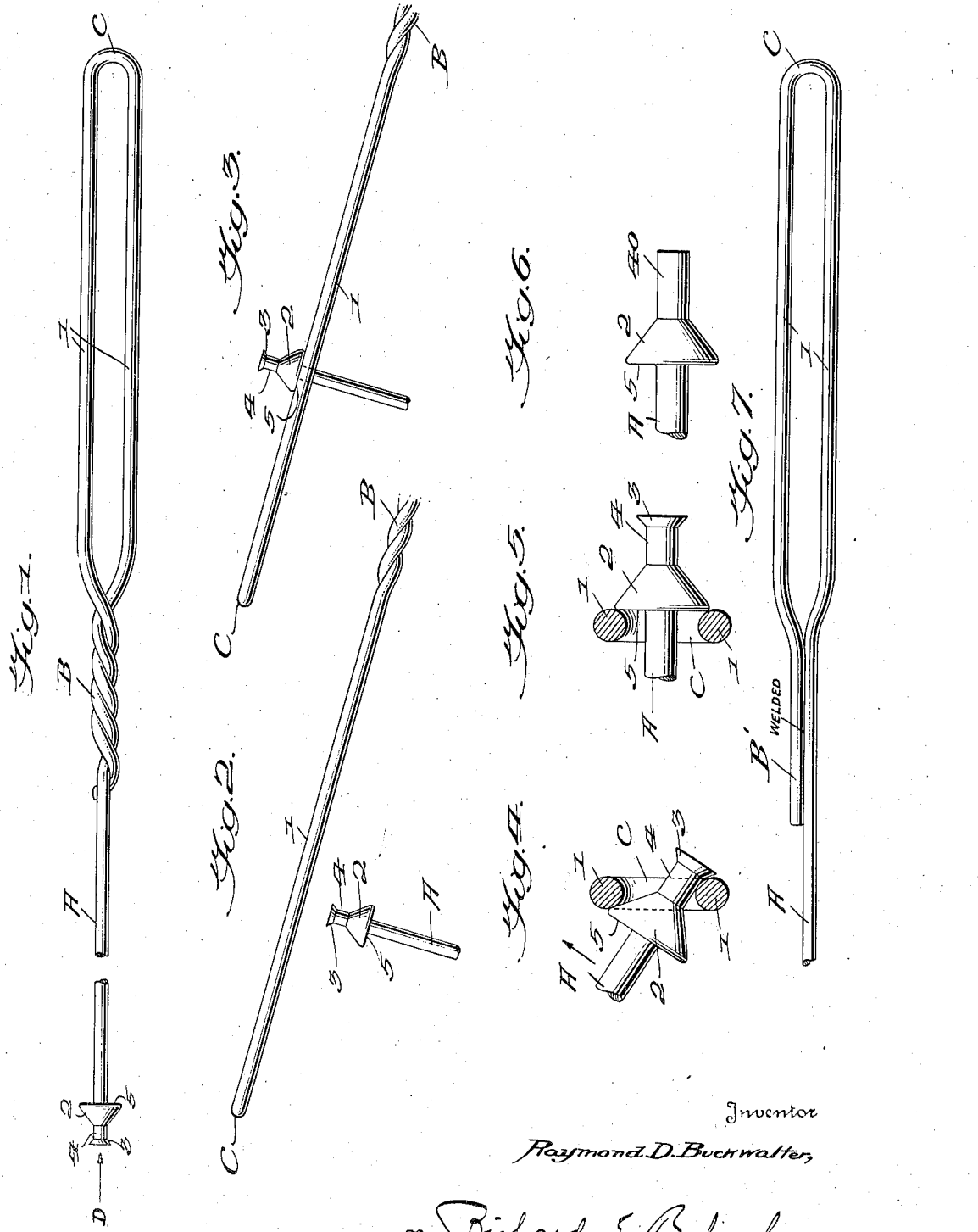
Inventor
Raymond D. Buckwalter,
By Richard E. Babcock
Attorney Patented Nov. 15, 1938

2,136,732

UNITED STATES PATENT OFFICE 2,136,732

BALING WIRE

Raymond D. Buckwalter, Lancaster, Pa.

Application March 12, 1937, Serial No. 130,601

7 Claims. (Cl. 24—27)

This invention relates to baling wire especially adapted for tying bales of straw, hay and similar materials.

In the operation of the usual baling machine, after the usual baling wires have been applied about a finished bale the latter is thereafter subject to the repeated compressing action of the plunger of the baler as another bale is formed and until the first bale is kicked out of the baling machine. These successive compressions by the plunger result in successively momentarily reducing the size of the finished bale, with resultant momentary loosening of the bale wire and frequently the forcing of the ends of the bale wire to loose overlapping relation. In cross-head and loop type bale wire connections as heretofore found such successive loosening of the wires by the compression of the plunger has quite frequently resulted in moving the cross head out of registry with the restricted portion of the loop as a compression stroke approaches its final stage. Thereafter on the quick removal of the pressure as the plunger is retracted the cross head of the bale wire, being then in registry with the enlarged portion of the loop, escapes through such enlarged portion.

Also, many prior cross head and loop quick connections have required to be made of a high carbon content wire in order that their loops will have sufficient stiffness and resiliency to maintain their form. Such high content carbon wire is expensive and the matter of expense in this particular field or article greatly limits and often prohibits the use of any except the cheapest possible grade of bale wire.

The present invention has been conceived and developed with the foregoing considerations in mind and has for its primary objects to provide a cross head and loop type bale wire or tie which will not separate under its usual conditions of use as above mentioned; to provide a special form of cross head facilitating, in combination with opposed faces of the loop, the insertion of the cross head through the loop; and to provide a bale wire or tie of this type which may be manufactured from the cheapest types or kinds of bale wire and in all gauges or sizes of bale wire without detracting from its certainty of operation.

In the accompanying drawing:

Figure 1 represents a top plan view of a length of bale wire, broken away, embodying my invention;

Figure 2, a side elevation of the end portion of the bale wire in juxtaposition, immediately prior to the insertion or threading of the cross head through the loop to connect the ends of the bale wire;

Figure 3, a similar view after the ends of the bale wire have been connected;

Figure 4, a transverse section through the loop showing the cross heads in side elevation in its position engaging the opposing faces of the opposing bars of the loop in the process of being inserted therethrough;

Figure 5, a similar view after the cross head has been inserted through the loop;

Figure 6, a detail side elevation of a modified form of cross head; and

Figure 7, a slightly modified form of loop.

In the drawing Figures 1, 2, 3 and 7 are made to a scale of approximately two and one sixth times actual size from an actual commercial embodiment of the invention and Figures 4, 5 and 6 are made on a larger scale, but in proportion.

Referring now in detail to the drawing, A designates a length of wire provided with the crosshead at one end and formed at its other end with a loop generally designated C, the extreme end portion of the wire looped to form the loop C in a portion of the wire A adjacent the inner end of the loop C being twisted together as at B to form and maintain the loop C. Preferably the cross head and the loop C will be formed integral with the wire A. The wire A may be of any size or gauge of wire and may be of any quality of wire, though a low cheap carbon content grade of wire is preferred as economy of manufacture is of vital importance from a commercial aspect and the invention has been conceived and designed or developed to enable the lowest grade or cheapest kind of wire to be used without adversely affecting or detracting from the efficiency of operation of the invention.

The loop C is formed as a long narrow oblong having parallel, or substantially parallel, side bars 1.

The cross head or button on the other end of the wire A and identified generally by D in Figure 1 will preferably be formed integral with the end of the wire by a well known upsetting operation and will preferably be of a round or approximately round contour that may be very generally and loosely referred to as spool form. The cross head is formed preferably with a flat face or bottom side extending substantially perpendicularly to the axis of the wire A and preferably for an equal distance on all sides thereof; a large frustro-conical face 2 tapering upwardly and inwardly to the lower end of a cylindrical portion 4 and a downwardly and inwardly tapering small frustro-conical face 3.

In operation the button or cross head on one end of the bale wire A is brought closely adjacent to the medial portion of the bars 1 of the loop C and thereafter the extreme upper end of the button at its small conical or frustro-conical face 3 cylindrical portions 4 is thrust between the medial portions of the bars 1 and swung transversely of said bars 1 until the face of large frustro-conical portion 2 engages the lower face of one of the bars 1 of the loop C and the diametrically opposite portion of the small frustro-conical face 3 engages the upper face of the opposite bar 1 of loop C in substantially the same transverse plane and thereafter continued slight pressure in the direction of the arrow in Figure 4 results in springing or spreading the medial portion of the bars 1 apart slightly to such extent as permits the large frustro-conical portion 2 to pass between the bars 1. When such large frustro-conical portion 2 has passed between the bars 1 the flat bottom face 5 of the cross head or button D will engage bars 1 or the end portion or both of the loop C and positively and efficiently certainly prevent the withdrawal of the cross head or button through the loop C.

Where a cheap soft low carbon content wire is used it has relatively slight resiliency so that unless allowance be made for this fact and the parts proportioned accordingly the bars 1 may not spring back after the cross head or button has been inserted between them, in case the loop C be made so short that its bars 1 are incapable of springing apart within the limit of their low resiliency but take a permanent set. On the other hand it is important that the lower face 5 of the button shall extend substantially or for a substantial area over both bars 1 to firmly engage the same and avoid any pressure simultaneously on the opposed radially inner faces of the bars 1 that might tend to spread them apart.

Having the foregoing considerations in mind, the loop C should be of such total length with relation to the largest diameter of the cross head or abutment that the latter may be inserted between the medial portions of the bars 1 of the loop C by springing the latter within the limits of their low degree of resiliency and without causing them to take a permanent set, and preferably the loop C should be appreciably longer than is required to satisfy the above condition in order to provide an ample margin of safety. Having the foregoing considerations in view I prefer to provide a loop C having an interior length approximately thirteen times the diameter of the lower face 5. However a loop C having an internal length only nine times the diameter of the face 5 and made of the poorest quality low carbon content wire would be of sufficient length to avoid the permanent bending or setting of the bars 1 when the cross head was threaded therethrough, if the cross head was threaded through the loop at the center thereof.

I find that the provision of the small frustro-conical face 3 in opposition to the enlarged frustro-conical face 2 is desirable and adds to the efficiency of the device as the face thereof engages the upper face of the one bar of the loop and tends to ride around the same as the face of the large frustro-conical portion 2 engages the lower face of the other bar 1 and springs the same laterally in place between the bars 1 of the loop C.

However, while this frustro-conical face 3 is an added feature of my invention and is a desirable thing, it is not essential to my invention considering it from its broader aspects and it may be omitted, the cylindrical portion being in such case substantially increased as shown at 40 in the modified form shown in Figure 6, the added length in such modified form preventing the springing of the bar 1 against which cylindrical portion 40 bears in the actual insertion operation.

In Figure 7 the construction and operation are the same as in the preferred form except that in this modified form instead of having the inner end portions of the loop twisted together as at B in Figure 1, the portions are welded together as at B', Figure 7.

I claim:

1. A baling wire comprising a strand of wire, and a loop formed at one end of said strand integral therewith and having longitudinally extending side bars disposed substantially parallel to each other for substantially the full length of said loop, in combination with securing means integral with the other end portion of said strand to be threaded through said loop, said securing means having a lower face extending radially outward at all points from said strand to engage the upper faces of the bars of said loop in the common plane thereof, said means being formed with opposed frustro-conical portions spaced apart by an intermediate cylindrical portion, the lower frustro-conical portion extending upward from approximately the lower face of the means and including the portion of said means of greatest diameter, the greatest diameter of said means exceeding the greatest width of said loop and being of a length not exceeding approximately one-ninth of the internal length of said loop.

2. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outwardly at all points from said strand to engage the upper faces of the bars of said loop in the common plane thereof, said means being formed with opposed frustro-conical portions spaced apart by an intermediate cylindrical portion, the lower frustro-conical portion extending upward from approximately the lower face of the means and including the portion of said means of greatest diameter, the greatest diameter of said means exceeding the greatest width of said loop and being of a length not exceeding approximately one-ninth of the internal length of said loop.

3. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outwardly at all points from said strand to engage the upper faces of the bars of said loop in the common plane thereof, said means being formed with two opposed radially inwardly tapering portions, the lower tapering portion extending upward and radially inward from approximately the lower face of the means and including the portion of said means of greatest diameter, the greatest diameter of said means exceeding the greatest width of said loop and the greatest diameter of said securing means and the length of said loop and the degree of resiliency of the material of said loop all being so proportioned and related that the bars of said loop will be sprung apart within the limits of their resiliency by the passage of said securing means between said bars without permanently deforming the same in a spread condition.

4. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outward at all points from said strand to engage the upper faces of the bars of said loop in the common plane thereof, said means being formed with an upwardly and inwardly tapering portion extending upward from approximately the lower face of the means and including the portion of said means of greatest diameter, and said means being provided with a top portion extending upward beyond said tapering portion, the greatest diameter of said means exceeding the greatest width of said loop and the greatest diameter of said securing means and the length of said loop and the degree of resiliency of the material of said loop all being so proportioned and related that the bars of said loop will be sprung apart within the limits of their resiliency by the passage of said securing means between said bars without permanently deforming the same in a spread condition.

5. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outwardly at all points from said strand to engage the upper faces of the bars of said loop in the common plane thereof, said means being formed with an upwardly and radially inwardly tapering portion extending upward from approximately the lower face of the means and including the portion of said means of greatest diameter, and said means being provided with an upward projecting stem extending upward from the upper part of said tapering portion for a distance in excess of the axial length of the latter, the greatest diameter of said means exceeding the greatest width of said loop and the greatest diameter of said securing means and the length of said loop and the degree of resiliency of the material of said loop all being so proportioned and related that the bars of said loop will be sprung apart within the limits of their resiliency by the passage of said securing means between said bars without permanently deforming the same in a spread condition.

6. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outwardly at all points from said strand to engage the upper faces of the bars of said loop in the common plane thereof, said means being formed with opposed frustro-conical portions spaced apart by an intermediate cylindrical portion, the lower frustro-conical portion extending upward from approximately the lower face of the means and including the portion of said means of greatest diameter, and said greatest diameter exceeding the greatest width of said loop.

7. A baling wire comprising a strand of wire, and a loop formed at one end of said strand and having longitudinally extending side bars disposed substantially parallel to each other for substantially the full length of said loop, in combination with securing means carried by the other end portion of said strand to be threaded through said loop, said securing means having a lower face extending radially outwardly at all points from said strand to engage the upper faces of the bars of said loop in the common plane thereof, said means being formed with two opposed radially inwardly tapering portions, the lower tapering portion extending upward and radially inward from approximately the lower face of the means and including the portion of said means of greatest diameter, and said greatest diameter exceeding the greatest width of said loop.

RAYMOND D. BUCKWALTER.